(12) United States Patent
Schneider

(10) Patent No.: US 8,694,798 B2
(45) Date of Patent: Apr. 8, 2014

(54) GENERATING AND SECURING MULTIPLE ARCHIVE KEYS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1144 days.

(21) Appl. No.: 12/125,826

(22) Filed: May 22, 2008

(65) Prior Publication Data

US 2009/0290707 A1 Nov. 26, 2009

(51) Int. Cl.
*G06F 21/00* (2013.01)

(52) U.S. Cl.
USPC .................................. 713/193; 380/44

(58) Field of Classification Search
USPC ................................ 380/44; 713/193
See application file for complete search history.

(56) References Cited

U.S. PATENT DOCUMENTS

| | | | | | |
|---|---|---|---|---|---|
| 5,046,036 | A | * | 9/1991 | Tezuka | 708/253 |
| 5,778,074 | A | * | 7/1998 | Garcken et al. | 380/37 |
| 5,940,507 | A | * | 8/1999 | Cane et al. | 713/165 |
| 6,023,506 | A | * | 2/2000 | Ote et al. | 713/165 |
| 6,249,866 | B1 | * | 6/2001 | Brundrett et al. | 713/165 |
| 6,549,626 | B1 | * | 4/2003 | Al-Salqan | 380/286 |
| 6,947,556 | B1 | * | 9/2005 | Matyas et al. | 380/29 |
| 6,986,043 | B2 | * | 1/2006 | Andrew et al. | 713/166 |
| 7,010,689 | B1 | * | 3/2006 | Matyas et al. | 713/168 |
| 7,020,282 | B1 | * | 3/2006 | Chang | 380/44 |
| 7,143,288 | B2 | * | 11/2006 | Pham et al. | 713/165 |
| 7,181,016 | B2 | * | 2/2007 | Cross et al. | 380/281 |
| 7,299,356 | B2 | * | 11/2007 | Mizrah | 713/169 |
| 7,392,384 | B2 | * | 6/2008 | Hopkins et al. | 713/168 |
| 7,506,161 | B2 | * | 3/2009 | Mizrah | 713/168 |
| 7,810,133 | B2 | * | 10/2010 | Carter et al. | 726/2 |
| 8,144,876 | B2 | * | 3/2012 | Schneider | 380/277 |
| 8,175,268 | B2 | * | 5/2012 | Schneider | 380/44 |
| 2001/0056541 | A1 | * | 12/2001 | Matsuzaki et al. | 713/193 |
| 2006/0179309 | A1 | * | 8/2006 | Cross et al. | 713/168 |
| 2006/0265595 | A1 | * | 11/2006 | Scottodiluzio | 713/180 |
| 2007/0118731 | A1 | * | 5/2007 | Zizzi | 713/153 |
| 2007/0143632 | A1 | * | 6/2007 | Matsuzaki et al. | 713/193 |
| 2007/0214369 | A1 | * | 9/2007 | Roberts et al. | 713/192 |
| 2010/0031051 | A1 | * | 2/2010 | Machani et al. | 713/181 |

OTHER PUBLICATIONS

Securing Distributed Storage: Challenges, Techniques, and Systems; Vishal Kher and Yongdae Kim; StorageSS'05 Nov. 11, 2005, Fairfax, Virginia, USA. Copyright 2005 ACM.*
Red Hat Office Action for U.S. Appl. No. 12/125,838, mailed Aug. 29, 2011.
Red Hat Notice of Allowance for U.S. Appl. No. 12/125,838, mailed Jan. 9, 2012.
Red Hat Supplemental Notice of Allowance for U.S. Appl. No. 12/125,838 mailed Mar. 6, 2012.

\* cited by examiner

*Primary Examiner* — Luu Pham
*Assistant Examiner* — James Turchen
(74) *Attorney, Agent, or Firm* — Lowenstein Sandler LLP

(57) ABSTRACT

A method and apparatus for generating multiple keys for a set of archives or portions of a set of archives. The process includes receiving a passphrase from a user and an indicator of a set of archives to be modified or created. An archive key generation process can be based on a random value generation, an algorithm for generating keys with specific characteristics, an indexing scheme, a progressive enciphering scheme or a shared secret scheme. The generated keys are enciphered using an enciphering algorithm in combination with the passphrase. The archive keys are stored with the archives in their enciphered form. Other intermediate key information is also stored with the archive to enable deciphering of the set of archives using the passphrase as needed.

12 Claims, 7 Drawing Sheets

| | Random Number | |
|---|---|---|
| Archive Key 0 | 0 1 0 1 1 ... | Index 0 ~ 501 |
| Archive Key 1 | 0 1 1 0 0 ... | Index 1 ~ 503 |
| Archive Key 2 | 1 0 0 1 1 ... | Index 2 ~ 505 |
| Archive Key 3 | 1 1 0 0 0 ... | Index 3 ~ 507 |

0 1 0 1 1 ...   XOR 0 1 1 0 0 ...   linear combination for archive key 3 having index 3

3 = 1 1  binary
    0th 1st
    Position         509

0 0 1 1 1 ...   Cipher Key ~ 511

GENERATING AND SECURING MULTIPLE ARCHIVE KEYS

CROSS-REFERENCE TO RELATED APPLICATIONS

Cross-reference is made to a co-pending application Ser. No. 12/125,838 by James P. Schneider for "Generating and Securing Archive Keys" filed on the same date as the present application and commonly owned.

TECHNICAL FIELD

Embodiments of the present invention are related to secure archive storage. Specifically, the embodiments of the present invention relate to a method and system for generating separate keys for multiple archives or sections of a single archive to be enciphered based on a single passphrase, where the passphrase can be changed without re-enciphering the archives or portions of the archive.

BACKGROUND

Archives are files and data structures that are stored in persistent storage systems. Persistent storage systems include fixed magnetic drives, flash memory devices, removable storage devices such as read-write compact discs (RW-CDs) drives and tape drives or similar storage devices. Archives are enciphered to secure the contents of the archive. An archive management program processes requests to access each archive by requesting a password from a user. The password is then input into a hashing algorithm to produce an archive key. The archive key is utilized to encipher the entire archive using a block cipher algorithm. However, the archive system presents several security and logistical problems. If the same password is used for multiple archives, then the same key is generated for each archive. Unauthorized decryption of an archive key that is utilized to encipher data is made easier the larger the set of enciphered data that is available. Thus, using the same archive key for multiple archives or each portion of a large archive is not desirable, because it creates a large data set that is more vulnerable to unauthorized access.

Another problem with the use of this method and system is that the change of a password requires that the entire archive be re-enciphered using a new archive key generated from the new password. Archives can be large and re-enciphering these archives can be time consuming and inconvenient. All archives enciphered with a changed archive key must be deciphered and then enciphered with a new key. Also, archives can be distributed over multiple volumes, which can be on separate devices or discs. As a result, the changing of the password can be very time consuming especially for large archives or archives with multiple volumes.

Creating multiple archive keys for different archives or sections of an archive can be accomplished by providing separate passwords to create each archive key or using a master key based on the password to generate additional keys. Generating additional keys based on a master key in this manner makes it difficult to change the password, as generated keys would need to be recalculated and each enciphered archive or portion of an archive would need to be re-enciphered. Also, controlling the characteristics of the additional keys is difficult.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 5 is a diagram of one embodiment of an indexing scheme.

DETAILED DESCRIPTION

Described herein is a method and apparatus for generating multiple keys for a set of archives or portions of a set of archives. The process includes receiving a passphrase from a user and an indicator of a set of archives to be modified or created. An archive key generation process can be based on a random value generation, an algorithm for generating keys with specific characteristics, an indexing scheme, a progressive enciphering scheme or a shared secret scheme. The generated keys are enciphered using an enciphering algorithm in combination with the passphrase. The archive keys are stored with the archives in their enciphered form. Other intermediate key information is also stored with the archive to enable deciphering of the set of archives using the passphrase as needed.

Figure 1:
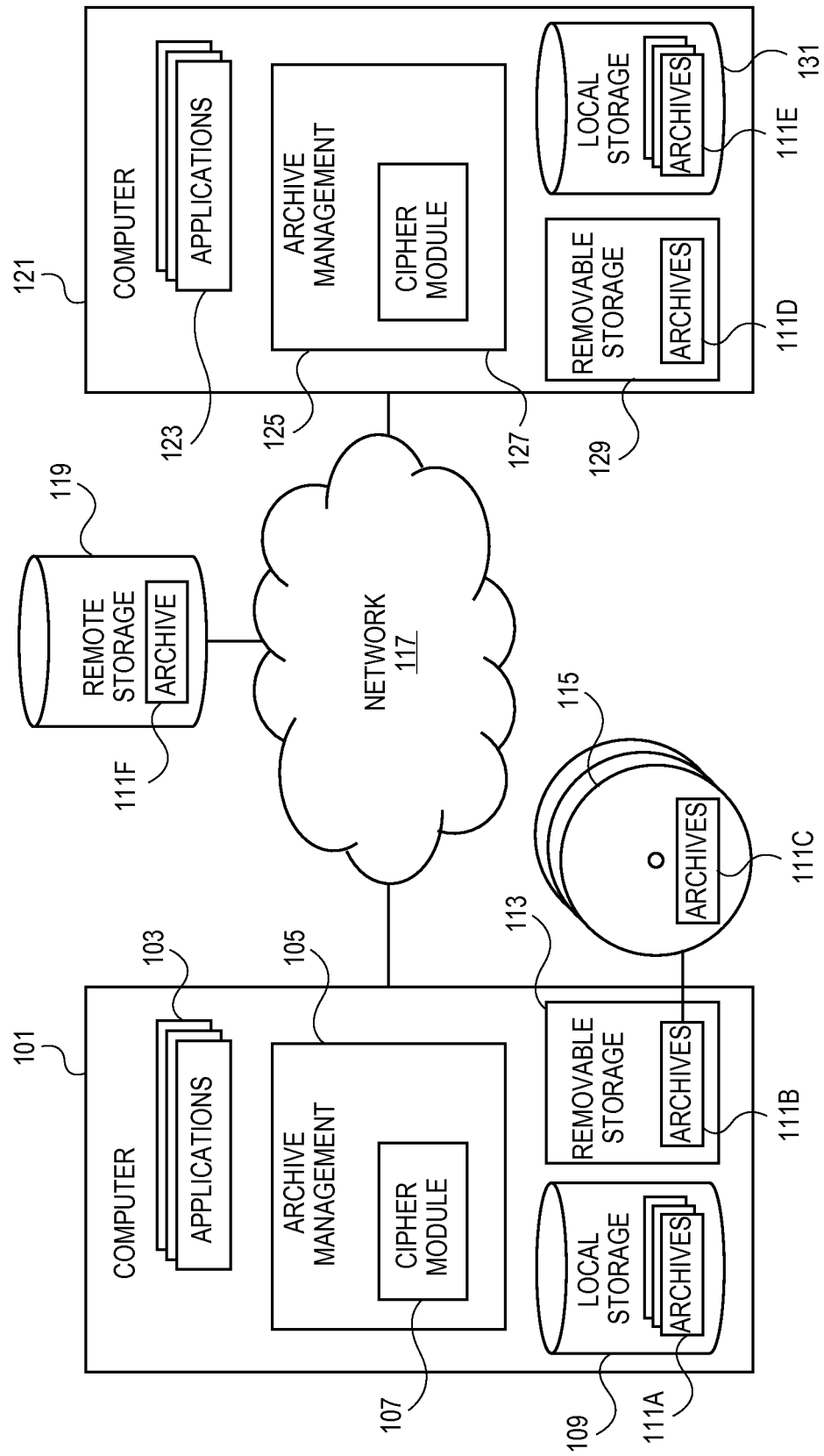
FIG. 1 is a diagram of one embodiment of a system for archive management.

FIG. 1 is a diagram of one embodiment of a system for archive management. The system includes at least one computing device such as computer 101. The computer 101 includes an archive management module 105 and a storage device such as a local storage device 109 or a removable storage device 113. In another embodiment, the computer 101 is part of a networked or distributed system where a network 117 connects the computer 101 to a remote storage device 119 or another computer 121.

The computer 101 can be any type of computing device including a desktop computer, server, laptop computer, console device, handheld device, wireless device or similar computing device. The computer 101 can execute any number of applications 103. Such applications 103 can include word processing programs, communication programs such as a browser or other programs. The local storage device 109 can be a fixed storage device such as a hard disk, flash memory device or similar device. The local storage device 109 provides persistent storage capacity for the computer 101. The local storage device 109 can be used to store any number of archives 111A. Such archives 111A can include any amount of data and can be stored in any format including an enciphered or unenciphered format. The computer 101 may include a removable storage device 113. Removable storage device 113 can include a compact disc read/write drive (CD-R/W), a digital versatile disc read/write drive (DVD R/W), a magnetic tape drive, a ZIP drive, a flash memory device or similar removable storage device. Any number and combination of local storage devices and removable storage devices can be present in the computer 101. Archives can be stored within a removable storage device or the media that are managed and manipulated by the removable storage device 113. The archives 111B and 111C in the removable storage device 113 or the removable media 115 can have any size or format including both enciphered and unenciphered formats.

An archive management module 105 manages the retrieval and storage of data for any number of archives 111A-111F. The archive management module 105 can be called or utilized by other programs (e.g., the applications 103) of the computer 101 to access or store data in archives. Related data can be stored in a single archive or may be distributed across multiple archives. In one embodiment, archive management module 105 includes a cipher module 107. The cipher module 107 can manage the enciphering and deciphering of data in archives 111A-111F. Archive management module 105 and cipher module 107 coordinate to query a user for a passphrase and an indicator of an archive from which data is to be accessed or into which data is to be stored. Cipher module 107 can include any type of ciphering algorithms including block ciphering algorithms, streaming ciphering algorithms or similar ciphering algorithms. The operation of the archive management module 105 and cipher module 107 is discussed in greater detail below in regard to FIGS. 2-6. In another embodiment, the functionality of the archive management module 105 and cipher module 107 are not separated into discrete components.

A network 117 can be any type of network including a local area network (LAN), a wide area network (WAN), such as the Internet, or similar network. The network 117 can include wired and/or wireless components. The network 117 can provide a communication medium between any number of computers 101, 121 and network devices such as a remote storage device 119 or similar devices.

The remote storage device 119 can be a stand-alone device coupled to a network 117 or can be administered by a separate device. The remote storage device 119 can be any size and utilize any format for storing data, including archived data 111F. The function of the remote storage device 119 can be controlled by a local machine or a remote machine including the computers 101, 121. The archive management module 105 can access or store data on the remote storage device 119 including archive data 111F.

The computer 121 can also execute applications 123 as well as an archive management module 125. The computer 121 may also include a removable storage device 129, local storage device 131 or similar storage devices. The components of the computer 121 can operate in the same manner and have an analogous structure to those described above in regard to computer 101.

The archive management modules 105, 125 of different computers 101, 121 can work in coordination with or at the direction of the other archive management modules 105, 125 of other computers 101, 121. This coordination enables storage of archives across multiple computers in a distributed fashion such that archives 111D, 111B in the removable storage devices 129, 113 and archives 111A, 111E in the local storage devices 109, 131 can be accessed or managed remotely.

Figure 2:
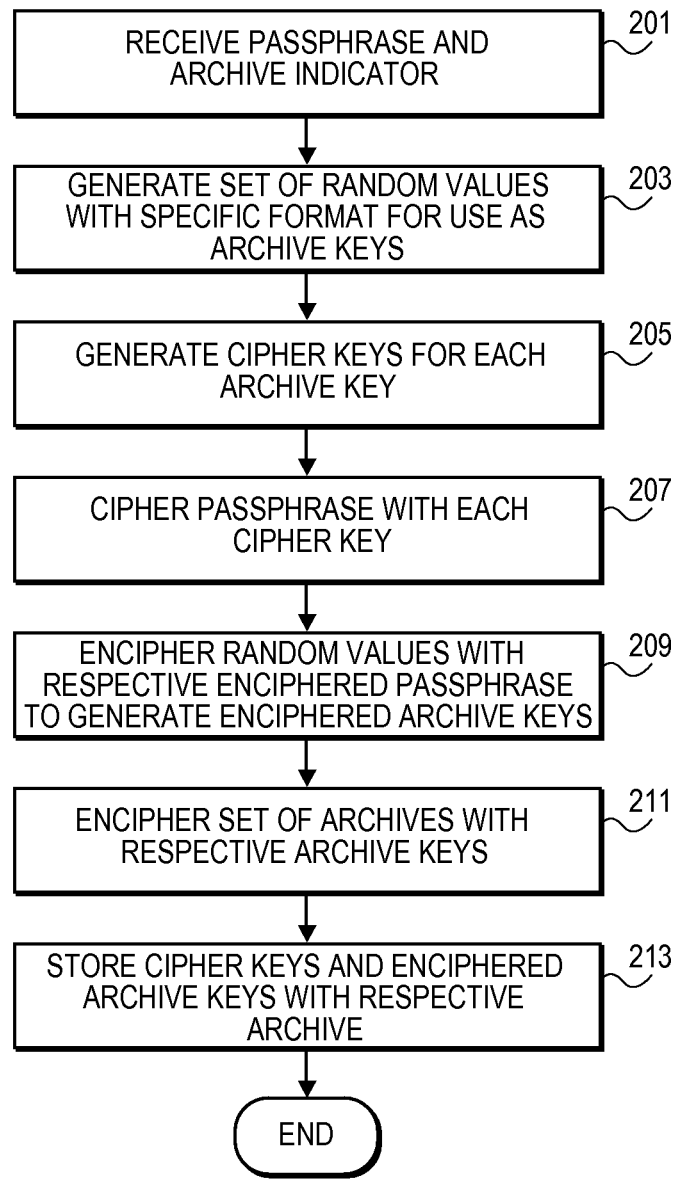
FIG. 2 is a flowchart of one embodiment of a process for generating a set of archive keys and enciphering an archive or set of archives based on a set of randomly generated values.

FIG. 2 is a flowchart of one embodiment of a process for generating a set of archive keys and enciphering a set of archives based on a set of randomly generated values. A 'set,' as used herein, refers to any positive whole number of items including one item. This process can be executed by any combination of the archive management module or the cipher module. The process can be initiated by receiving a passphrase and archive indicator from a user (block 201). The receipt of the passphrase and archive indicator can be in response to a query or prompt for such information or can be provided as parameters in a call to the archive management module or cipher module.

The received passphrase can be of any size and have any alphanumeric value. The archive indicator can be an address or pointer to a set of archives to be accessed, created or similarly managed. Additional parameters can also be received that provide additional information including an address or location of data to be inserted into a set of archives, location to which data being retrieved from an archive is to be placed or similar information relevant to the execution of the process. The additional parameters can also include information regarding methods for generating random values in the process of generating archive keys, indicators for the number of subdivisions or portions of an archive or number of keys to be generated in the enciphering process and similar data related to the enciphering or deciphering processes.

The process described here in regard to FIG. 2 is an enciphering process. One of ordinary skill in the art would understand that an analogous deciphering process can utilize the same principles and techniques to reverse the enciphering process and retrieve data from an archive. For the sake of clarity, the deciphering process has not been described in detail. However, one of ordinary skill in the art would be able to utilize the principles and techniques described in relation to the enciphering process to decipher data using a passphrase and archive location information based on the description of the enciphering process. Similarly, the discussion below in regard to FIGS. 3-6 has been limited to enciphering for sake of clarity.

One skilled in the art would also understand that for each of the processes described in regard to FIGS. 2-6, changing the password can be accomplished in a process analogous to that disclosed in co-pending application "Generating and Securing Archive Keys." Where an old and new passphrase are provided and the old pass phrase is utilized to decipher the archive keys and the new passphrase is used to re-encipher the archive keys using a method dependent on the enciphering methods described herein.

Returning to a discussion of FIG. 2, a set of random values are generated for use as archive keys (block 203). Any random number generation algorithm may be used to generate the archive keys. In another embodiment, specific algorithms or functions are utilized to generate the archive keys to ensure that the archive keys have a specific format or relationship to one another. For example, the keys may be generated to be prime numbers, primitive polynomials, such as primitive polynomials in $GF(2^m)$ or to have similar formats or relationships. The random values are to be used as archive keys. Each archive key to be used as a key in a ciphering algorithm for a different archive or portion of an archive.

A set of cipher keys are then generated (block 205). A cipher key is generated for each archive key. The set of cipher keys can be generated using any random number generator or any specific algorithm or function such that a desired size, format or interrelationship between the cipher keys can be generated. Cipher keys each have a correspondence to an archive key. In one embodiment, this correspondence is a 1:1 correspondence such that each archive key has its own separate, related cipher key. In other embodiments, other ratios or combination of cipher keys can be utilized with the archive keys. For example, multiple cipher keys can be generated for each archive key and used for separate iterations of enciphering over the archive key.

The passphrase is then enciphered with each cipher key (block 207). As a result, a separate enciphered passphrase is generated for each archive key and cipher key pair. The algorithm used to encipher the passphrase can be a hashing algorithm, a message authentication code (MAC) algorithm, where the cipher key is used as the key for that algorithm in enciphering the passphrase. As a result, each enciphered passphrase is unique or at least distinct from the other enciphered passphrases.

The enciphered passphrases are then utilized to encipher each of the corresponding random values that are being utilized as the archive keys (block 209). A set of enciphered archive keys is then generated where there is a 1:1 correspondence between the enciphered archive keys and the sets of related archive keys, enciphered passphrases and cipher keys. These related sets of keys and enciphered passphrases each correspond to a separate archive or portion of an archive that is to be enciphered.

The set of archives or portions of the archives are then enciphered with the respective archive keys (block 211). Any method may be utilized for associating a set of archives or archive portions with a set of archive keys. The set of archives or archive portions can be enciphered using any block or streaming ciphering algorithm such as DES, RC4 or similar enciphering algorithms. In another embodiment, the archive enciphering process can be performed at another time relative to or in parallel with the other processes as it can be performed at any time after the archive keys are generated.

The cipher keys and enciphered archive keys are then stored within respective archives or in another known location (block 213). The cipher keys and enciphered archive keys can be stored at any location within a set of archives or portions of archives. The location can be a known location or a location that can be derived from information known to a deciphering process. The cipher keys and enciphered archive keys can be stored with other metadata. The cipher keys are stored in the clear. Other metadata can be stored in the clear or can be enciphered.

The cipher keys and enciphered archive keys are retrieved during the deciphering process and combined with a supplied passphrase from the user. The cipher keys are utilized with a passphrase and the hashing algorithm or a MAC algorithm to encipher the passphrases. The passphrase is then utilized to decipher the archive key. The archive key is then utilized to decipher the desired portion of the archive key.

Figure 3:
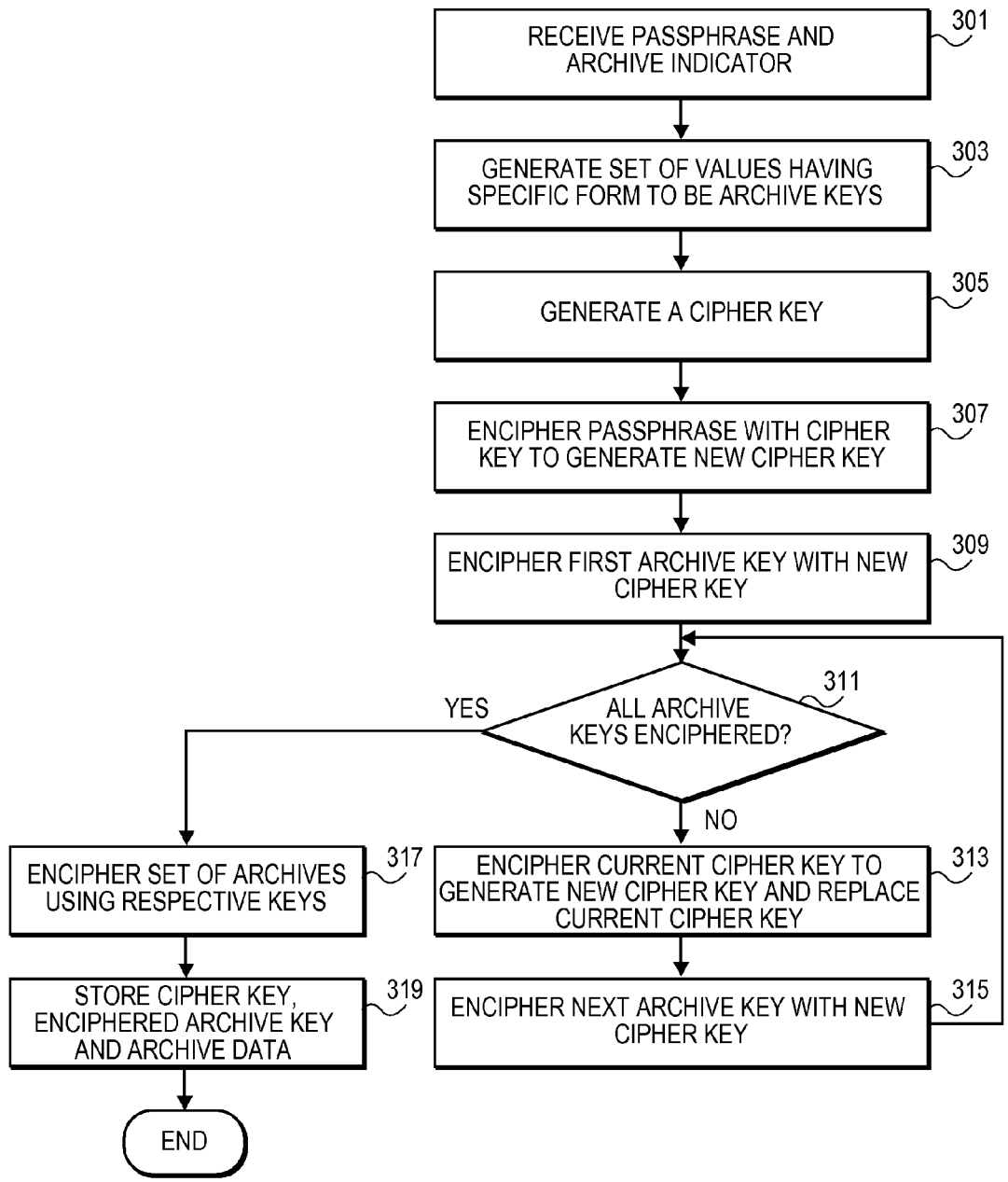
FIG. 3 is a flowchart of one embodiment of a process for generating a set of archive keys and enciphering an archive or set of archives based on a progressive enciphering scheme.

FIG. 3 is a flowchart of one embodiment of a process for generating a set of archive keys and enciphering an archive or set of archives based on a progressive enciphering scheme. This process may be initiated in response to receiving a passphrase and archive indicator from a user (block 301). The passphrase can be any alphanumeric value and have any size. The archive indicator specifies an archive to be managed or generated. The archive indicator may be an address or location of the archive. The received passphrase, archive indicator and other parameters are analogous to those described above in regard to the process related to FIG. 2.

A set of values are generated having a specific format that are to be used as archive keys (block 303). Any pseudo-random number generator or similar algorithm can be utilized to generate the archive keys. The archive keys can be generated to have a specific format or relationship to one another, such as each of the keys being a prime number, binary presentation of a set of primitive polynomials, such as primitive polynomials in $GF(2^m)$ or values with similar characteristics or inter-relationships.

A cipher key is also generated (block 305). The cipher key can be generated as a random value having a specific format or size. The cipher key can be generated using any algorithm and can have any relationship to the archive key. For example, the cipher key can be generated to be the same size as the archive key or to have a length compatible with a specific ciphering algorithm.

The passphrase is enciphered using the cipher key to generate a new cipher key (block 307). Any algorithm may be utilized to encipher the passphrase, such as a hashing algorithm, a MAC algorithm or similar algorithm. The resulting enciphered passphrase is then utilized as a new cipher key that replaces the previous cipher key and/or is included in an indexing scheme.

The first archive key is then enciphered using the new cipher key (block 309). The archive key can be enciphered using a block cipher, stream cipher or any other appropriate reversible ciphering algorithm that can utilize the new cipher key. A check is then made to determine if all of the archive keys have been enciphered (block 311). Any number of archive keys can be generated based on the parameters specified when calling the process or similarly provided. The number archive keys that are generated can also be based on a default value.

If all the archive keys have been enciphered, then the set of archives designated by the archive indicator or the portions of the archives designated by the archive indicator are then enciphered using respective archive keys that have been assigned to each of the portions or archives (block 317). The enciphered archive key, corresponding original cipher key (in the state prior to transformation by the passphrase) and the enciphered archive data are stored in the designated archive (block 319). Archive key-enciphered key relationships ordering data may also be stored. The cipher key and enciphered archive key can be stored in any known location and have a fixed position within a respective section of an archive or archive. In another embodiment, the location of the cipher key and enciphered archive key is derived from known information by a deciphering process.

Data can be retrieved from the set of archives during a deciphering process. The deciphering process must associate each enciphered archive key with its respective cipher key and must also determine the order in which the archive keys were enciphered as well as the order in which the cipher keys were generated in order to decipher the archive data. That is the deciphering process must reverse the iterative process by which each cipher key is generated to determine each archive key.

If all the archive keys have not been enciphered (block 311), then the current cipher key is re-enciphered to generate a new cipher key and replace the current cipher key. The current cipher key can be stored in an index, array or similar storage mechanism with the other prior cipher keys to track the relative order of the cipher keys with respect to the associated archive keys and archive data (block 313). The hashing algorithm, MAC algorithm or similar algorithm can be used to generate the new cipher key. The current or previous cipher key can be utilized as a key to re-encipher the passphrase or itself, the current cipher key.

The next archive key is then enciphered with the new cipher key (block 315). The new cipher key and the next archive key are associated with one another such that they are stored in known locations with a fixed association or additional data is stored in the archives or portions of the archives that specify the relationship so that the appropriate archive keys can be deciphered with the appropriate cipher keys during a deciphering operation. A check is then made again to determine if all of the archive keys have been enciphered (block 311). This process continues until all of the archive keys have been enciphered, during which process the cipher keys for each of the archive keys change by re-enciphering the passphrase or previous cipher key with each iteration or progression being based on the previous iteration.

Figure 4:
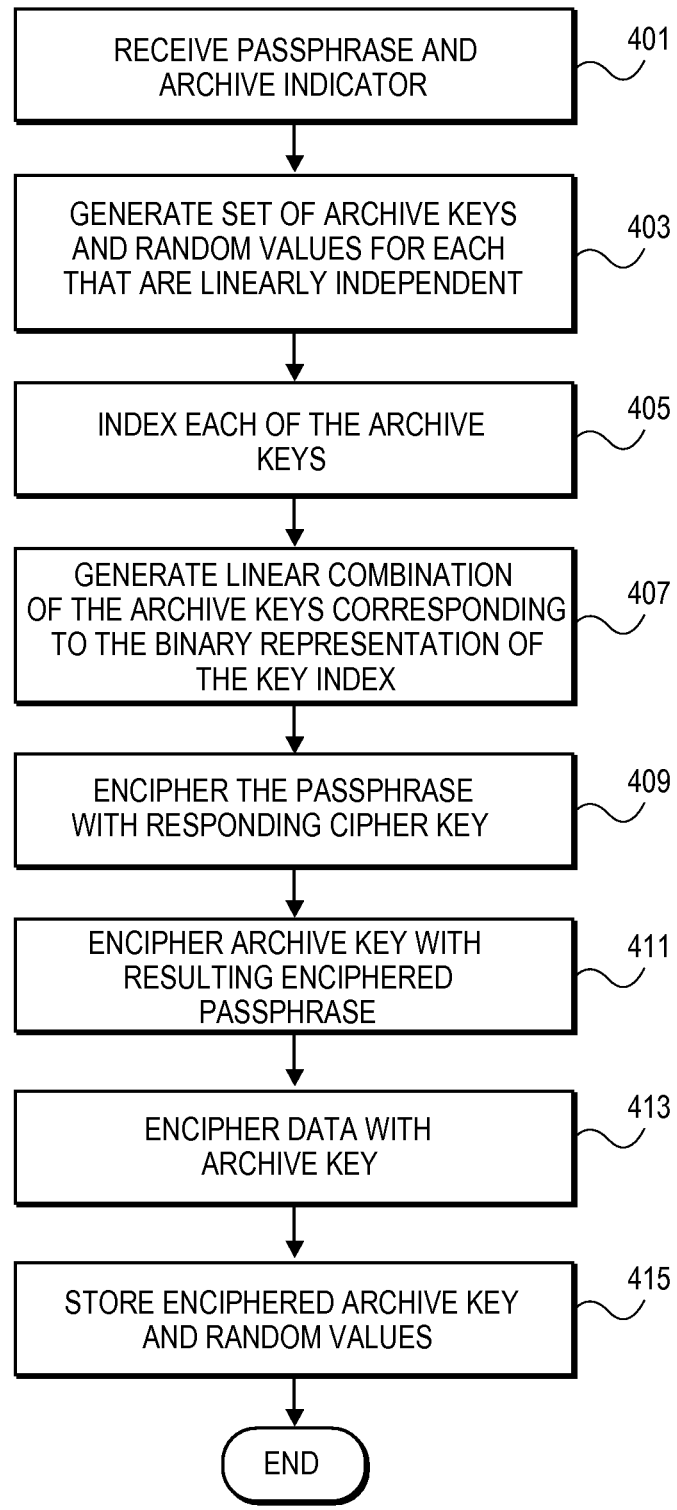
FIG. 4 is a flowchart of one embodiment of a process for generating a set of archive keys and enciphering an archive or set of archives based on an indexing scheme.

FIG. 4 is a flowchart of one embodiment of a process for generating a set of archive keys and enciphering an archive or set of archives based on an indexing scheme. The process is initiated in response to receiving a passphrase and archive indicator (block 401). The passphrase can be any alphanumeric value and have any size. The archive indicator may also be accompanied by other parameters. The received passphrase, archive indicator and other parameters are analogous to those described above in regard to the process related to FIG. 2.

The process continues by generating a set of archive keys and random values for each archive key (block 403). The random values are generated to be linearly independent. A set of numbers is linearly independent if none of the numbers can be written as a linear combination of the other numbers in the set. For example, if a set of numbers is linearly independent, it is not possible to obtain any of the random values in a set by XORing some or all of the numbers together. In some embodiments, at least floor(lg(n))+1 random values are generated, which can be constructed into at least n distinct keys.

Each of the archive keys and linearly independent values are indexed (block 405). Then a linear combination of the random values corresponding to the binary representation of the index of each of the archive keys is generated (block 407). This process is illustrated in FIG. 5, where the keys 0, 1, 2, 3 are associated with a set of linearly independent random values, which are each assigned an index in a series of steps 501 through 507. Then for each archive key, the linear combination for that key using the corresponding random values for the index for that key number are linearly combined, for example, using XOR in example step 509. In this example step, the archive key 3, which is binary 1 1 is derived by combining the random values at index 0 and 1, since the values at each of those places is 1. The result of the combination of these random values using the XOR operation is a cipher key for the corresponding archive key 3 (see step 511). In the example presented in FIG. 5, only the five most significant digits of the randomly generated binary numbers are presented for the sake of clarity, as random generated binary numbers for this process can be of any length, but are typically 128, 192 or 256 bits or larger. The larger the key the stronger the resulting enciphering. Currently, 128 bits is considered sufficient, although as computing power increases larger keys may become necessary.

One skilled in the art would appreciate that similar principles and analogous techniques can be utilized to assign archive keys to randomly generated numbers that are linearly independent and then combine these linearly independent values in a new combination to generate cipher keys. The assignment processes can be based on indexing schemes, round robin schemes, fixed order schemes and similar schemes or algorithms.

Returning to the discussion of FIG. 4, each of the archive keys has an enciphered passphrase generated using the corresponding cipher key (block 409). The archive keys can then be enciphered with the resulting enciphered passphrase (block 411). Each of the portions or designated archives is then enciphered using the archive keys (block 413). Any block or streaming ciphering algorithm can be utilized in combination with the archive keys for each of the corresponding sections or designated archives.

The enciphered archive keys and associated random values are also stored in the archives or designated portions of the archives (block 415). The enciphered archive keys and random values may be stored in known or relatively fixed positions within the archives or the associated portions of the archives such that a deciphering algorithm can retrieve these and associate them with each other, as well as determine the appropriate indexing scheme such that it can be recreated in combination with the passphrase to decipher the archive keys.

Figure 6:
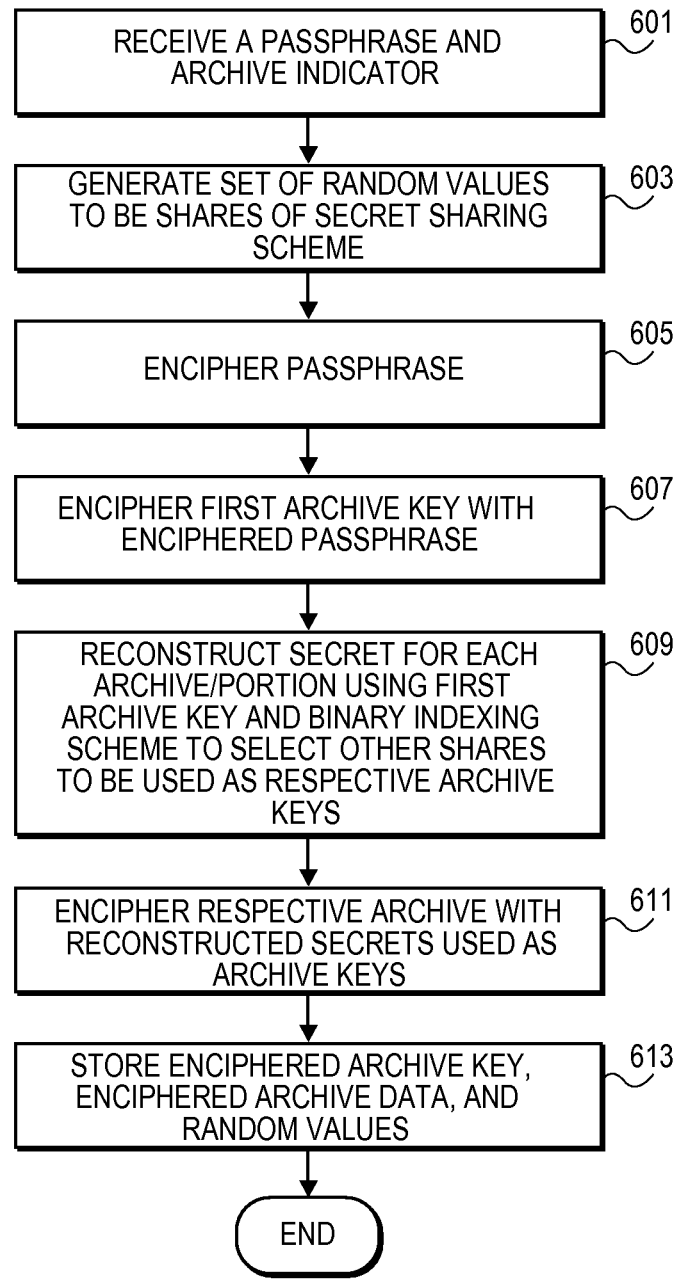
FIG. 6 is a flowchart of one embodiment of a process for generating a set of archive keys and enciphering an archive or set of archives based on a secret sharing scheme.

FIG. 6 is a flowchart of one embodiment of a process for generating a set of archive keys and enciphering a set of archives based on a secret sharing scheme. This process is initiated in response to receiving a passphrase and an archive indicator (block 601). The passphrase can have any alphanumeric value and size. The archive indicator can have any set of associated parameters that are passed with it. The received passphrase, archive indicator and other parameters are analogous to those described above in regard to the process related to FIG. 2.

A set of random values are generated using a random number generator to be part of a secret sharing scheme (block 603). Each of the values that are generated will constitute a share of a secret sharing scheme. Any random number generator can be utilized and each of the generated values may be of the same size and/or have other similar characteristics to one another. Any number of shares can be generated depending on the number of archives or portions of an archive to be enciphered. A passphrase can be enciphered using any hashing algorithm, MAC algorithm or similar algorithm (block 605). A key for enciphering the passphrase using such algorithms may be randomly generated, use available or derived data or can be similarly generated.

The first archive key is enciphered using the enciphered passphrase (block 607). Ciphering algorithm that is reversible such as a block or streaming cipher can be used to encipher the first archive key using the enciphered passphrase as a key. The first archive key can be selected using any selection algorithm or based on a fixed order.

For each archive or portion of an archive to be enciphered, a secret is reconstructed using the first archive key and a binary indexing scheme to select other shares to be used as in the secret reconstruction (block 609). The binary indexing can be tied to a binary representation of respective archive key order. The corresponding archive or portion of an archive is then enciphered using the reconstructed secret as the archive key (block 611). The enciphered archive key, enciphered archive data and associated random values are stored in the appropriate archive or portion of an archive (block 613). The enciphered archive key and random values can be stored in any known location or any location that can be derived by a deciphering process based on available information.

One skilled in the art would appreciate that the principles and techniques for utilizing secret shares that are reconstructed as keys for enciphering archive keys can be utilized. Other embodiments can include using any combination of the enciphered archive key, the enciphered passphrase and the binary or similar indexing of the randomly generated values as input to reconstruct a secret share. This process is a non-standard usage of a secret share scheme, where the secret is known and the shares generated for the specific secret. Instead, a set of shares are generated and a secret specific to those shares is 'reconstructed.'

Figure 7:
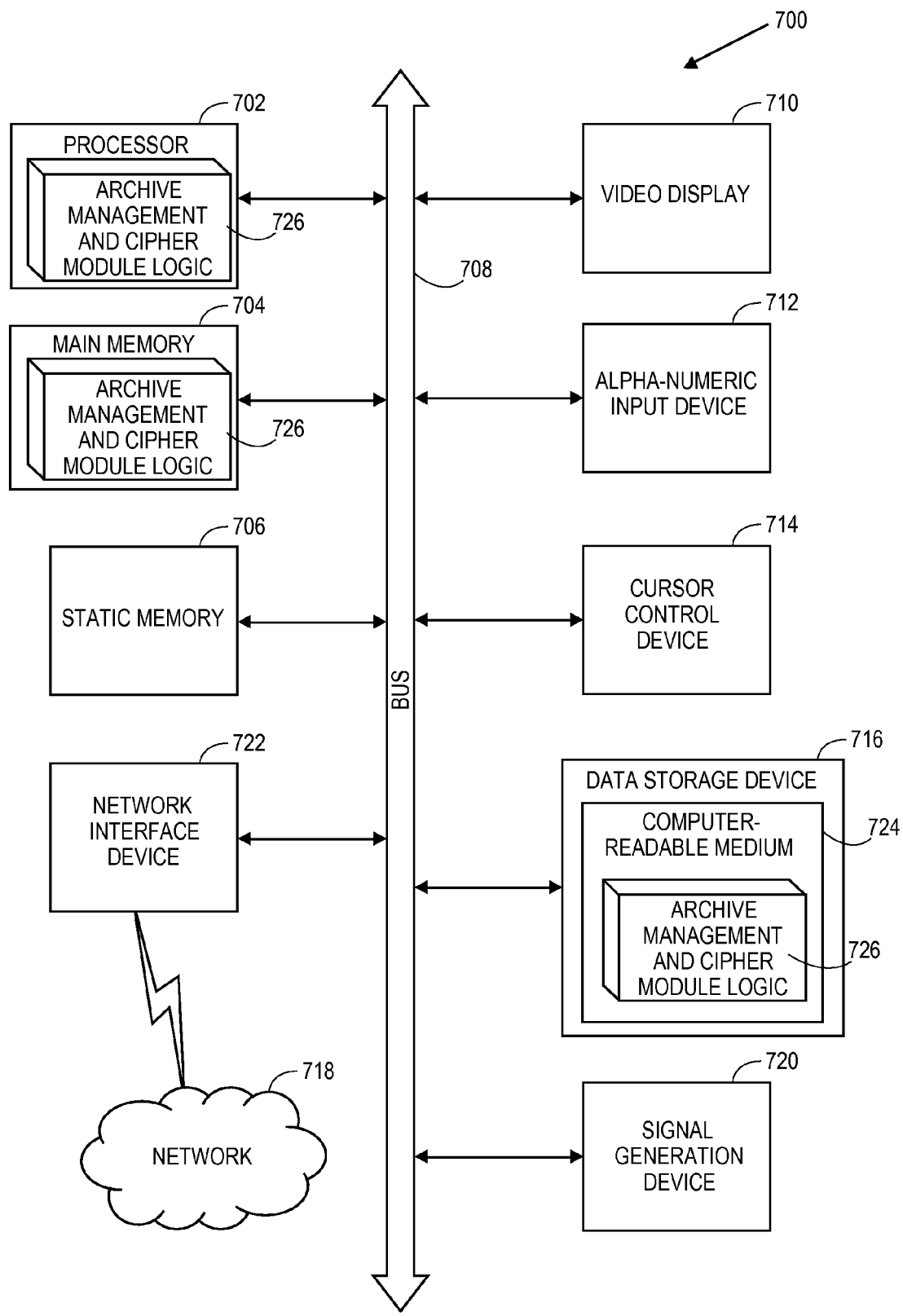
FIG. 7 is a diagram of one embodiment of a computer system for generating multiple archive keys.

FIG. 7 illustrates a diagrammatic representation of a machine for generating multiple archive keys, the machine is in the exemplary form of a computer system 700 within which a set of instructions, for causing the machine to perform any one or more of the methodologies discussed herein, may be executed. In alternative embodiments, the machine may be connected (e.g., networked) to other machines in a LAN, WAN, an intranet, an extranet, or the Internet. The machine may operate in the capacity of a server or a client machine (e.g., the computer executing the archive management module in a distributed archiving scheme) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable medium), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the archive management logic or cipher logic 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., archive management logic or cipher logic 726) embodying any one or more of the methodologies or functions described herein. The logic 726 may also reside, completely or at least partially, within the main memory 704 and/or within the processing device 702 during execution thereof by the computer system 700, the main memory 704 and the processing device 702 also constituting machine-readable storage media. The logic 726 may further be transmitted or received over a network 718 via the network interface device 722.

The machine-readable storage medium 724 may also be used to store the archive management logic or cipher logic 726 persistently. While the machine-readable storage medium 724 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "retrieving," "encrypting," "truncating," "replacing," "calculating," "recalculating," "comparing," "validating," "authenticating," "enciphering," "deciphering," "storing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for generating a pseudorandom number for use in an authentication process has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving a passphrase;
   generating a cipher key that is a value having a specified form;
   enciphering the passphrase using the cipher key to generate an enciphered passphrase to be used as a new cipher key;
   enciphering the new cipher key using a previous cipher key used to generate the new cipher key in an iterative process until a number of generated new cipher keys is equal to a number of a plurality of archive keys, wherein each new cipher key is generated in view of a unique previous cipher key;
   enciphering each of the plurality of archive keys using a respective cipher key from the generated new cipher keys;
   enciphering, by a computer system processing device, each of a plurality of data portions using a respective archive key of the plurality of archive keys; and
   storing each of the enciphered plurality of data portions with the respective cipher key and a respective enciphered archive key.

2. The computer-implemented method of claim 1, wherein the plurality of values have a form of prime numbers or primitive polynomials.

3. The computer-implemented method of claim 1, further comprising:
   generating the plurality of archive keys using a pseudorandom number generator to have a specific format.

4. The computer-implemented method of claim 1, further comprising:
   storing each of the generated new cipher keys to be subsequently utilized in the enciphering the plurality of archive keys.

5. A computer-implemented method comprising:
   receiving a passphrase;
   generating a plurality of secret shares;
   enciphering the passphrase to generate an enciphered passphrase;
   enciphering an archive key using the enciphered passphrase;
   generating a plurality of secrets by combining the archive key and at least one of the plurality of secret shares, wherein the combination of the archive key and at least one of the plurality of secret shares is based on a binary indexing scheme; and
   enciphering, by a computer system processing device, a respective portion of data using a respective one of the plurality of secrets.

6. The computer-implemented method of claim 5, further comprising:
   enciphering a plurality of portions of data each with a separate secret from the plurality of secrets.

7. A non-transitory computer readable storage medium, having a set of instructions stored therein, which when executed cause a processing device to perform a set of operations comprising:
   receiving a passphrase;
   generating a cipher key that is a value having a specified form;
   enciphering the passphrase using the cipher key to generate an enciphered passphrase to be used as a new cipher key;
   enciphering the new cipher key using a previous cipher key used to generate the new cipher key in an iterative process until a number of generated new cipher keys is equal to a number of a plurality of archive keys, wherein each new cipher key is generated in view of a unique previous cipher key;
   enciphering each of the plurality of archive keys using a respective cipher key from the generated new cipher keys;
   enciphering, by a computer system processing device, each of a plurality of data portions using a respective archive key of the plurality of archive keys; and
   storing each of the enciphered plurality of data portions with the respective cipher key and a respective enciphered archive key.

8. The non-transitory computer readable storage medium of claim 7, wherein the plurality of values have a form of prime numbers or primitive polynomials.

9. The non-transitory computer readable storage medium of claim 7, wherein the set of operations comprises:
   generating the plurality of archive keys using a pseudorandom number generator to have a specific format.

10. A non-transitory computer readable storage medium, having a set of instructions stored therein, which when executed cause a processing device to perform a set of operations comprising:
    receiving a passphrase;
    generating a plurality of secret shares;
    enciphering the passphrase to generate an enciphered passphrase;
    enciphering an archive key using the enciphered passphrase;
    generating a plurality of secrets by combining the archive key and at least one of the plurality of secret shares, wherein the combination of the archive key and at least one of the plurality of secret shares is based on a binary indexing scheme; and
    enciphering, by a computer system processing device, a respective portion of data using a respective one of the plurality of secrets.

11. The non-transitory computer readable storage medium of claim 10, wherein the set of operations comprises:

enciphering a plurality of portions of data each with a separate secret from the plurality of secrets.

12. A system comprising:
a memory comprising instructions; and
a processing device coupled to the memory, the processing device to execute the instructions to perform operations comprising:
receiving a passphrase;
generating a cipher key that is a value having a specified form;
enciphering the passphrase using the cipher key to generate an enciphered passphrase to be used as a new cipher key;
enciphering the new cipher key using a previous cipher key in an iterative process until a number of generated new cipher keys is equal to a number of a plurality of archive keys; wherein each new cipher key is generated in view of a unique previous cipher key;
enciphering each of the plurality of archive keys using a respective cipher key from the generated cipher keys;
enciphering, by the processing device, each of a plurality of data portions using a respective archive key of the plurality of archive keys; and
storing each of the enciphered plurality of data portions with the respective cipher key and a respective enciphered archive key.

* * * * *